(No Model.)
J. OLD.
GATE VALVE.
No. 364,952. Patented June 14, 1887.
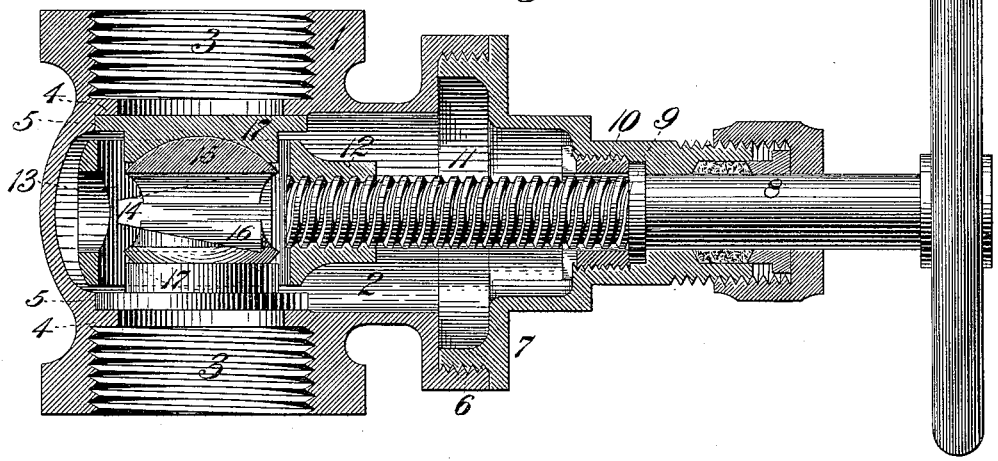
Fig. 1.
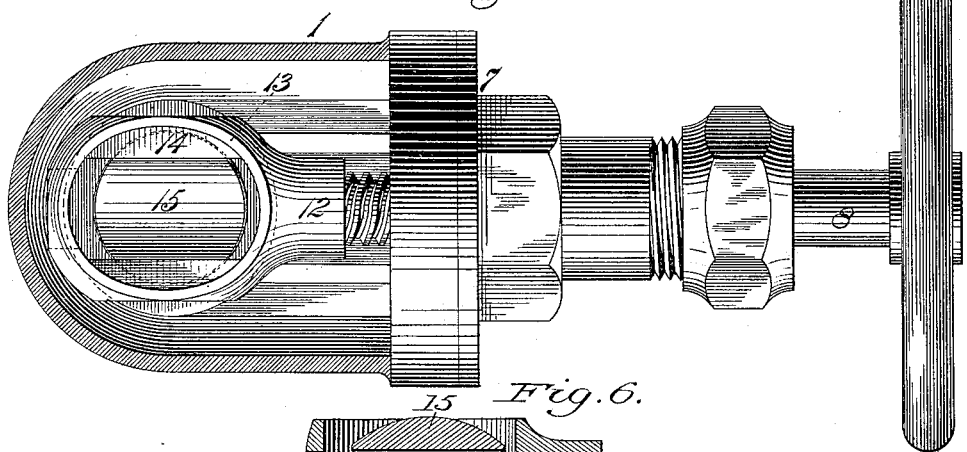
Fig. 2.
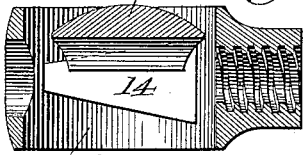
Fig. 3.
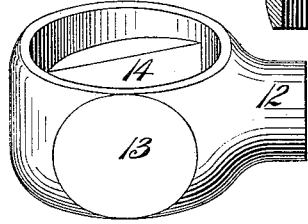
Fig. 6.
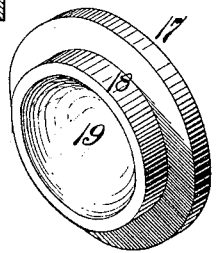
Fig. 4.
Fig. 5.
WITNESSES:
Dennis S. Wolcott
C. M. Clarke
INVENTOR.
James Old
BY George H. Christy
ATTORNEY.
N. PETERS, Photo-Lithographer, Washington, D. C.

UNITED STATES PATENT OFFICE.

JAMES OLD, OF ALLEGHENY, PENNSYLVANIA.

GATE-VALVE.

SPECIFICATION forming part of Letters Patent No. 364,952, dated June 14, 1887.

Application filed March 13, 1885. Serial No. 158,676. (No model.)

*To all whom it may concern:*

Be it known that I, JAMES OLD, a citizen of the United States, residing at Allegheny, in the county of Allegheny and State of Pennsylvania, have invented or discovered certain new and useful Improvements in Gate-Valves, of which improvements the following is a specification.

In the accompanying drawings, which make part of this specification, Figure 1 is a longitudinal sectional elevation of my improved gate-valve. Fig. 2 is a side elevation of the same, the case being broken away and one of the valves and its bearing being removed to show the inner structure of the yoke or carrier. Fig. 3 is a perspective view of the yoke or carrier. Fig. 4 is a similar view of one of the valve-disks. Fig. 5 is an edge view of one of the ball-bearings. Fig. 6 is a detail view showing the yoke and the bearing for the valve-disk, the yoke being partially broken away.

The object of my invention is to so construct a straight way or gate-valve as to prevent the wearing away of the valve-disks and their seats by reason of the sliding or reciprocation of the disks over the seats while forcibly held against each other during the opening and closing movements of the disks, and at the same time to provide for the self adjustment of the disks to their seats during such closing movements.

Within the case 1 is formed a valve-chamber having openings into the sockets 3, located on opposite sides of the case, and within the chamber around the openings into the sockets are formed the annular valve-seats 4, said seats being in planes practically parallel to each other and being provided at their lower sides with shoulders or stops 5, whose function will be fully hereinafter stated. On the upper portion of the case is formed the thread-socket 6, for the reception of the cap 7, and through this cap is formed an axial opening, through which passes the valve-stem 8, said opening having a threaded enlargement at its inner end for the reception of a collar, 9, formed on the stem 8, said collar and stem being held from longitudinal movement by the annular nut 10, fitting within the threaded enlargement.

On the lower portion of the valve-stem are formed threads 11, adapted to engage corresponding threads formed in the boss 12, of the yoke or carrier 13, said carrier being provided on its inner walls with the wedge-shaped abutments 14, the apices of said abutments being adjusted to the lower side of the yoke. The sides of these abutments form ways on which are mounted the bearings 15. In the under side of these bearings and along diametrically opposite sides thereof are formed the inclined seats 16, adapted to rest upon the inclined sides of the abutments 14 in the yoke, the diameter of the bearings somewhat less than the diameter of the opening in the yoke 13, thereby permitting of considerable movement of the bearings along the sides of the abutments 14. The outer face of the bearings 15 is made convex, forming a curved seat for the circular valve-disks 17, having a flat outer surface adapted to fit and bear upon the seats 4 in the valve-chamber, and provided on their rear sides with projections 18, in the ends of which are formed concave sockets 19, for the reception of the convex portions of the bearings 15. The inner surface of the bearings between the inclined seats is provided with a groove, 20, of sufficient depth to permit of the passage of the thread end of the valve-stem between them as the yoke is drawn up by the rotation of said stem. The valve-chamber is made to extend beyond the lower ends of the valve-seats 4 a sufficient distance to permit the yoke passing down beyond the ends of said valve-seats.

The operation of my improved valve is as follows; and in describing the operation I assume the yoke as raised and the valve open for the free passage of the fluid therethrough. When the yoke is in the upper part of the valve-chamber, the bearings 15 will rest in the lower part of said yoke and bear upon the sides of the abutments at their narrowest part, and consequently permitting the disks to move inward, in which position the distance between the outer faces of the disks is less than the distance between the valve-seats 4. As the yoke is moved down by the rotation of its stem the disks and bearings will move down therewith, remaining at the lower end of the yoke until the disks abut against the stops 5, by which the further downward movement of the disks and bearings is arrested. Then the further downward movement of the yoke into the lower part of the case beyond the seats forces the wedge-shaped abutments on through between the bearings 15, thereby causing an outward movement of the bearings and the valve-disks, the latter being forced firmly against their seats. If the seats 4 should have irregular surfaces, or any substance should be caught between the disks and seats, the former are free to turn and accommodate themselves to such irregularity, or in turning to force said substance out from between themselves and their seats. In opening the valve the above stated movements are reversed. The yoke in rising pulls the abutments from between the bearings, thereby permitting the latter and the disks to move inward away from the seats before any upward motion is imparted to them. Thus the disks and seats are preserved as against the wear incident to moving along each other when held together by pressure.

The terms "upward" and "downward" are only used relatively in the above description, such terms being applicable only when the valve is placed in a vertical or nearly vertical position.

As the action of one of the abutments 14 is sufficient to seat the valves, if desired, the bearing 15 may be omitted on one side, the valve-disk on that side being supported in the yoke by its journal projection 18. Or one of the sides of the abutment 14 may be made parallel with the line of movement of the yoke, and the under side of the bearing for that side being correspondingly constructed.

I am aware that gate-valves have been made wherein the valve-plates are formed with wedge-shaped backs and the plunger provided with a wedge-shaped lower end for forcing the valve-disks apart and against their seats, and do not therefore claim such a construction.

I claim herein as my invention—

1. In a gate-valve, two valve-disks provided with bosses on their rear faces, in combination with bearings for said disks provided with inclined seats, and an annular yoke or carrier engaging the bosses on the rear faces of the disks and provided with wedge-shaped abutments forming ways for the bearings, substantially as set forth.

2. In a gate-valve, two valve-disks provided with circularly-recessed bosses on the rear faces, in combination with bearings having convex faces and provided with inclined seats on their rear sides, and an annular yoke or carrier engaging the bosses on the disks, and provided with wedge-shaped abutments, substantially as set forth.

3. In a gate-valve, two valve-disks, in combination with bearings therefor provided with inclined seats on their rear faces, and a yoke or carrier provided with inclined abutments for ways for the bearings, substantially as set forth.

In testimony whereof I have hereunto set my hand.

JAMES OLD.

Witnesses:
DARWIN S. WOLCOTT,
R. H. WHITTLESEY.